United States Patent [19]

Carrafiello et al.

[11] Patent Number: 5,440,691
[45] Date of Patent: Aug. 8, 1995

[54] SYSTEM FOR MINIMIZING UNDERFLOWING TRANSMIT BUFFER AND OVERFLOWING RECEIVE BUFFER BY GIVING HIGHEST PRIORITY FOR STORAGE DEVICE ACCESS

[75] Inventors: Michel W. Carrafiello, Hudson; Walter K. Niskala, Salem; Benjamin J. Brown, Chichester, all of N.H.

[73] Assignee: Digital Equipment Corporation, Pat. Law Group, Maynard, Mass.

[21] Appl. No.: 843,797

[22] Filed: Feb. 27, 1992

[51] Int. Cl.[6] ............................................. G06F 13/14
[52] U.S. Cl. ................... 395/250; 395/200.01; 364/239; 364/239.6; 364/239.7; 364/DIG. 1
[58] Field of Search ........................ 395/250, 425, 200; 364/239.6, 238.6, 239.51, 284.1, 939.6, 926.3, 239, 939, 239.7

[56] References Cited

U.S. PATENT DOCUMENTS

| | | | |
|---|---|---|---|
| 4,839,891 | 6/1989 | Kobayashi et al. | 370/60 |
| 4,866,597 | 9/1989 | Kinoshita | 364/200 |
| 4,942,553 | 7/1990 | Dalrymple | 364/900 |
| 5,083,269 | 1/1992 | Syobatake et al. | 395/425 |
| 5,155,821 | 10/1992 | Sone et al. | 395/375 |
| 5,224,213 | 6/1993 | Dieffenderfer et al. | 395/250 |
| 5,249,271 | 9/1993 | Hopkinson et al. | 395/250 |
| 5,301,274 | 4/1994 | Li | 395/250 |

Primary Examiner—Thomas C. Lee
Assistant Examiner—Moustafa M. Meky
Attorney, Agent, or Firm—A. Sidney Johnston; David A. Dagg

[57] ABSTRACT

A technique for managing bidirectional data flow between a first data bus, such as in a local area network, having a fixed data flow rate once access has been obtained, and a memory or storage device connected to a second data bus having variable latency. Inbound data from the first data bus are temporarily stored in a receive buffer memory and later forwarded to the storage device. Outbound data bursts are retrieved from the same storage device, temporarily stored in a transmit buffer memory, and later transmitted onto the first data bus. The invention controls the steps of forwarding inbound data to the storage device and retrieving outbound data from the storage device, in such a manner as to make efficient use of the second data bus and to minimize the possibility of overflowing the receive buffer memory during a receive operation, or underflowing the transmit buffer memory during a transmit operation. When transmitting is in progress, priority is given to supplying outbound data to the transmit buffer memory, with any inbound data being processed only if the transmit buffer memory is sufficiently full. When receiving is in progress, priority is given to emptying inbound data from the receive buffer memory, with any outbound data being processed only if the receive buffer memory is sufficiently empty. When neither transmitting nor receiving is in progress, priority is giving to emptying the receive buffer memory, then filling the transmit buffer memory.

9 Claims, 3 Drawing Sheets

SYSTEM FOR MINIMIZING UNDERFLOWING TRANSMIT BUFFER AND OVERFLOWING RECEIVE BUFFER BY GIVING HIGHEST PRIORITY FOR STORAGE DEVICE ACCESS

BACKGROUND OF THE INVENTION

This invention relates generally to techniques for transferring data between two asynchronous systems and, more particularly, to a technique for controlling buffer memories installed between a local area network and a system memory. The system memory will be referred to as a storage device, to avoid confusion with two buffer memories that will shortly be introduced.

In a typical network, data must be received and transmitted at a speed fixed by the network characteristics, and a network user has no control of this speed once a transmission or reception operation is started. When data is received from the network, it is usually transferred to a storage device, through a system bus, to await further processing, but the system bus to which the storage device is connected is, in most systems, shared by other functional modules, such as a central processing unit and various peripheral devices. Therefore, immediate access to the storage device is not guaranteed. The storage device access, through the system bus, is said to have variable latency or delay.

A well known solution to this difficulty is to provide a buffer memory between the network and the system bus. The buffer memory can continue to receive data from the network even when access to the system bus is temporarily denied. When access to the storage device is subsequently granted, the buffer memory is emptied, and "catches up" with the network. There is, of course, the possibility of an overflow condition, when access to the storage device is denied for long enough that the buffer memory becomes completely filled.

A similar difficulty is presented during transmission of data from the storage device to the network. Once network access is granted, data must be sent at a predetermined fixed rate, but the storage device may not always be able to supply data at this rate. Another buffer memory in the transmit path allows a limited amount of data to be supplied to the network even when access to the storage device is temporarily denied. In this case, there is the possibility of buffer memory underflow, when the buffer memory is completely emptied by the demand of data from the network, and access to the storage device continues to be denied.

Traditional designs for managing buffer memories in communication systems have treated transmit and receive operations as completely independent of each other. If a receive operation is in progress, priority is given to completion of the operation, at least until a complete packet of data is received and stored in the storage device. Only then is any attention given to possible transmit operations, but if another receive packet is recognized before the transmit operation begins the transmit operation is aborted. In a busy network, receive operations can completely monopolize the buffer manager's time, and transmission may be delayed indefinitely.

Another approach is to interleave receive and transmit operations on the storage device. This allows a transmission to be ready and able to start even though data transfers due to the receive operation have not been completed. This approach has the advantage that it makes more aggressive use of the network communication channel, but has the disadvantage that it is more prone to overflows and underflows, because it requires the system bus to carry more data in the same amount of time.

What is still needed in this field is a more efficient buffer memory management system, which minimizes or avoids buffer memory overflow and underflow conditions, but provides aggressive sharing of transmit and receive operations with minimum loss of data. An obvious solution is simply to increase the size of the buffer memories until overflow and underflow conditions are reduced to a desired level. However, this increases hardware cost and can impose additional time delays in both the transmit and receive paths.

Another approach is simply to require that the system bus have higher speed or greater "width" (the number of parallel data bits handled by the bus), so that the conflicting requirements for system bus access can be met without significantly improving the buffer management technique. Obviously, this approach also increases hardware costs and is not a completely satisfactory solution either.

It will be appreciated from the foregoing that there is still a need for a more efficient buffer memory management system for use in interfacing between asynchronous components, such as a local area network and a storage device with variable latency. The present invention is directed to this end.

SUMMARY OF THE INVENTION

The present invention resides in a technique for managing bidirectional data flow between a first data bus, such as in a local area network, having a fixed data flow rate once access has been obtained, and a memory or storage device connected to a second data bus having variable latency. Inbound data bursts from the first data bus are temporarily stored in a receive buffer memory and later forwarded to the storage device. Outbound data bursts are retrieved from the same storage device, temporarily stored in a transmit buffer memory, and later transmitted onto the first data bus.

The invention controls the steps of forwarding inbound data to the storage device and retrieving outbound data from the storage device, in such a manner as to make efficient use of the second data bus and to minimize the possibility of overflowing the receive buffer memory during a receive operation, or underflowing the transmit buffer memory during a transmit operation. When transmitting is in progress, priority is given to supplying outbound data to the transmit buffer memory, with any residual inbound data being processed only if the transmit buffer memory is sufficiently full. When receiving is in progress, priority is given to emptying inbound data from the receive buffer memory, with any outbound data being processed only if the receive buffer memory is sufficiently empty. When neither transmitting nor receiving is in progress, priority is given to emptying the receive buffer memory of any residual inbound data, then filling the transmit buffer memory with any outbound data.

Briefly, and in general terms, the method of the invention comprises the steps of receiving an inbound data stream from the first data bus at a fixed rate, once reception of data begins, and immediately storing the inbound data received from the first data bus in a receive buffer memory; forwarding inbound data stored in the receive buffer memory to the storage device, by way of the second data bus; retrieving outbound data from the storage device, by way of the second data bus, and storing the retrieved outbound data in a transmit buffer memory; transmitting outbound data stored in the transmit buffer memory onto the first data bus, at a rate that is fixed once access is granted to the first data bus; and controlling the steps of forwarding inbound data to the storage device and retrieving outbound data from the storage device, in such a manner as to require only small receive and transmit buffer memories and to minimize overflow of the receive buffer memory and underflow of the transmit buffer memory.

The novelty of the method lies in the controlling step, wherein access to the second data bus for forwarding inbound data and retrieving outbound data, is efficiently managed. More specifically, the step of controlling includes determining whether transmitting is in progress, and, if transmitting is in progress, giving highest priority for storage device access to the step of retrieving outbound data from the storage device, whereby the possibility of underflowing the transmit buffer memory is minimized.

Even more specifically, if transmitting is in progress, the step of controlling includes determining whether the transmit buffer memory is "nearly empty" as indicated by a preselected threshold level having been reached; and, if the transmit buffer memory is nearly empty, initiating a request to retrieve more outbound data from the storage device. If the transmit buffer memory is more full than nearly empty, and if the receive buffer memory is not empty, the controlling step further includes initiating a request to forward inbound data to the storage device.

If transmitting is not in progress, the controlling step includes giving highest priority for storage device access to the step of forwarding inbound data to the storage device, whereby the possibility of overflowing the receive buffer memory is minimized. More specifically, the step of controlling then includes determining whether a step of forwarding inbound data to the storage device is needed and, if so, initiating a request to forward inbound data to the storage device. If a step of forwarding inbound data to the storage device is not needed, the step of controlling includes determining whether a step of retrieving outbound data from the storage device is needed and, if so, initiating such a request.

Determining whether a step of forwarding inbound data to the storage device is needed depends on whether or not receiving is in progress. If receiving is in progress, forwarding of inbound data is needed if the receive buffer memory is "nearly full," as indicated by a preselected memory threshold level having been reached. If receiving is not in progress, this is indicative of an idle condition, since it was previously determined that transmitting was not in progress. In an idle condition, if the receive buffer is not empty there is a need to perform a step of forwarding inbound data to the storage device.

In terms of apparatus, the invention comprises a receive buffer memory, for temporary storage of inbound data received from the first data bus and destined for the storage device; a transmit buffer memory, for temporary storage of outbound data retrieved from the storage device and destined for the first data bus; means for receiving an inbound data stream from the first data bus at a fixed rate, once reception of data begins, and immediately storing the inbound data received from the first data bus in the receive buffer memory; means for forwarding inbound data stored in the receive buffer memory to the storage device, by way of the second data bus; means for retrieving outbound data from the storage device, by way of the second data bus, and storing the retrieved outbound data in the transmit buffer memory; means for transmitting outbound data stored in the transmit buffer memory onto the first data bus, at a rate that is fixed once access is granted to the first data bus; and means for controlling the means for forwarding inbound data to the storage device and the means for retrieving outbound data from the storage device, in such a manner as to require only small receive and transmit buffer memories and to minimize overflow of the receive buffer memory and underflow of the transmit buffer memory.

More specifically, the means for controlling operations on the second data bus includes means for determining whether transmitting is in progress; and transmit priority means, operative only if transmitting is in progress, giving highest priority for storage device access to the means for retrieving outbound data from the storage device, whereby the possibility of underflowing the transmit buffer memory is minimized. The transmit priority means includes means for determining whether the transmit buffer memory is "nearly empty" as indicated by a preselected threshold level having been reached, means operative only if the transmit buffer memory is nearly empty, for initiating a request to retrieve more outbound data from the storage device, and means operative only if the transmit buffer memory is more full than nearly empty, and if the receive buffer memory is not empty, for initiating a request to forward inbound data to the storage device.

The apparatus further includes receive priority means, operative only if transmitting is not in progress, giving highest priority for storage device access to the means for forwarding inbound data to the storage device, whereby the possibility of overflowing the receive buffer memory is minimized. The receive priority means includes means for determining whether forwarding inbound data to the storage device is needed and, if so, initiating a request to forward inbound data to the storage device; and means operative only if forwarding inbound data to the storage device is not needed, for determining whether retrieving outbound data from the storage device is needed and, if so, initiating such a request.

More specifically, the means for determining whether forwarding inbound data to the storage device is needed includes means for determining whether receiving is in progress; means operative only if receiving is in progress, for determining whether the receive buffer memory is "nearly full" as indicated by a preselected memory threshold level having been reached; and means operative only if neither receiving nor transmitting is in progress, for determining whether the receive buffer memory is not empty. A nearly full receive buffer memory while receiving, or a not empty receive buffer while not receiving, each indicate a need for forwarding inbound data to the storage device.

It will be appreciated from the foregoing that the present invention represents a significant advance in buffer memory management handling bidirectional data flow between two asynchronous data buses. In particular, priority for access to the variable-latency bus is determined by the mode of operation, i.e. whether transmitting, receiving or idle, and in part by the degree to which the buffer memories are filled, which is indicative of the latency of the data bus. Other aspects of the invention will become apparent from the following more detailed description, taken in conjunction with the accompanying drawings.

DESCRIPTION OF THE PREFERRED EMBODIMENT

Figure 1:
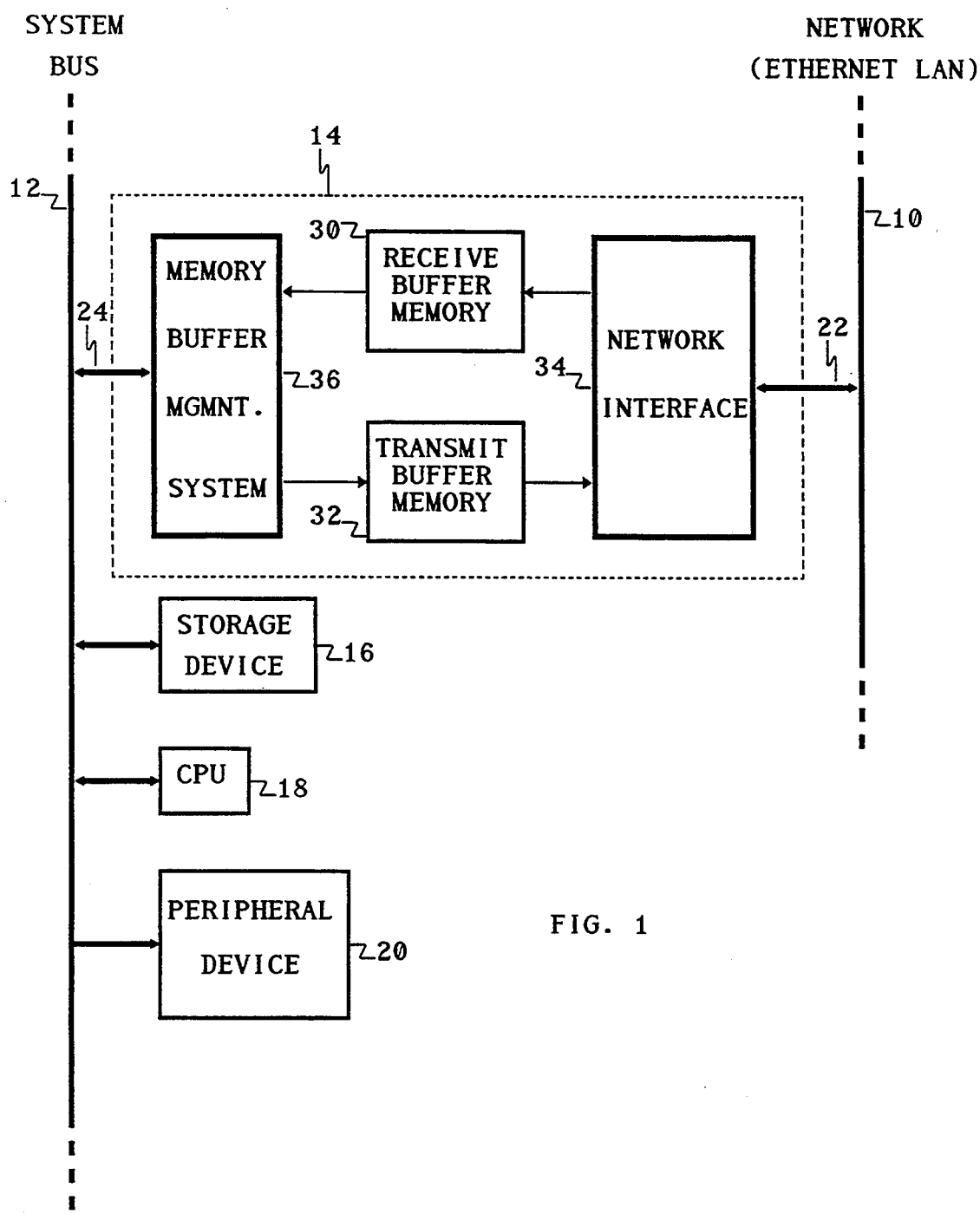
FIG. 1 is a block diagram depicting an interface circuit installed between a local area network and a system bus having variable latency.

As shown in the drawings for purposes of illustration, the present invention is concerned with a system for managing buffer memories interfacing between a local area network and a system bus to which a memory, i.e., storage device is connected. As shown in FIG. 1, a local area network, indicated by reference numeral 10 is connected to a system bus 12 through an interface circuit 14. The system bus 12 provides connections to a memory, i.e., storage device 16, a central processing unit (CPU) 18, and possibly other devices, such as peripheral units, one of which is shown at 20.

The network 10 is connected to the interface circuit 14 through a bidirectional path 22, and the system bus 12 is connected to the interface circuit through a bidirectional path 24. During a receive operation, data is transferred from the network 10 into the interface circuit 14 and is eventually transferred to the storage device 16 to await further processing. During a transmit operation, data retrieved from the storage device 16 is transferred from the interface circuit 14 to the network 10. The network transfers data to and from the interface circuit 14 at a fixed rate, which cannot be controlled once a receive operation or a transmit operation has been started. In the system illustrated, and in most other typical systems, the system bus 12, which provides access to the storage device 16, is not always immediately available to perform read or write operations. The bus 12 may be busy performing operations involving other devices connected to it, or may be performing a read operation at about the same time that the interface circuit 14 needs to perform a write operation. The system bus 12 is, therefore, said to have variable latency.

To accommodate this variable latency, the interface circuit 14 includes two FIFO (for first-in-first-out) buffer memories, referred to as a receive buffer memory 30 and a transmit buffer memory 32. Data entering the interface circuit 14 over line 22 from the network 10 passes through a conventional network interface 34, then through the receive buffer memory 30 and a memory buffer management system 36, to be output onto the system bus 12 and written to the storage device 16. Data to be transmitted is read from the storage device 16 and passes through the buffer memory management system 36 and the transmit buffer memory 32, before being output through the network interface 34 and onto the network 10.

The apparatus as described thus far is similar to others that use buffer memories to compensate for dissimilar data rates in two systems that transmit data from one to the other. A goal in all such apparatus is to manage the bidirectional data flow in such a manner as to avoid or minimize loss of data. Data loss in a network environment is not necessarily fatal, and some loss is anticipated. Most messages transmitted on the network require acknowledgment, and recovery can usually be effected by repeating the message until it is received without error. Data will be lost if the receive buffer memory 30 cannot be emptied to the storage device 16 fast enough to keep up with the fixed data rate at which the network 10 is supplying data. This is called an overflow condition. For flow in the transmit direction, data will be lost if the transmit buffer memory 32 cannot be kept full enough to supply data at the rate required by the network 10. This is called an underflow condition. Various buffer management approaches have been used to try to avoid buffer overflow and underflow, but have not made the most efficient use of the network, or have needed large and costly buffer memories.

Figure 2:
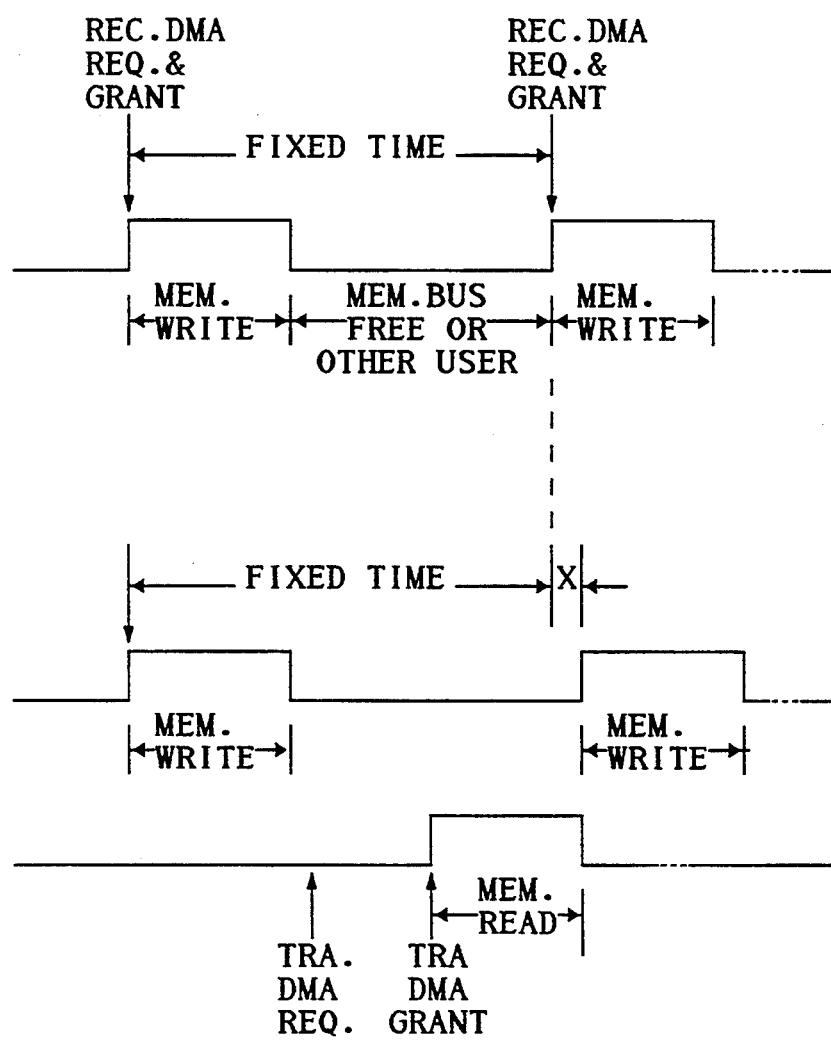
FIG. 2A is a timing diagram showing the times of storage device accesses to write received data when a receive operation has priority.
FIG. 2B is a timing diagram similar to FIG. 2A, and showing an interleaved storage device read operation to retrieve data to be transmitted, when a receive operation still has priority.

FIG. 2A shows diagrammatically how the storage device 16 is accessed for receive operations, i.e. involving writes to the storage device. To keep up with data received from the network 10, the buffer management system has to make regular and periodic writes to the storage device 16, at intervals determined by the size of the bursts of data written and by the data rate of the network. For example, if the network data rate is 10 megabits per second (Mb/s) and data is written in 16-byte bursts, then write operations would be needed every 12.8 $\mu$s (microseconds). Once system bus access has been granted, a 16-byte burst can be written in about 5–6 $\mu$s.

Access to the storage device 16 for the purpose of storing received data is by way of a receive DMA (direct memory access). A DMA involves a request for access and a subsequent grant of access. As discussed further below, access to the storage device 16 for the purpose of retrieving data to be transmitted is by way of a transmit DMA, which also requires a request and a grant.

If receive DMA requests were immediately granted, as indicated in FIG. 2A, this would leave a significant time between memory write accesses, during which a memory read access could be attempted, by way of a transmit DMA request, to load any data to be transmitted into the transmit buffer memory, where it would be ready to be transmitted onto the network. The difficulty, of course, is that immediate access to the system bus is not always granted, as depicted by way of further example in FIG. 2B. As shown, if a storage device read request, i.e. a transmit DMA request, is not immediately granted, the next storage device write request (receive DMA request) will be delayed, by a time indicated in the example as X. This time interval represents the degree to which the interface circuit 14 has fallen behind in handling received data from the network 10. When the accumulated time by which the interface circuit has fallen behind reaches an amount equivalent to the capacity of the receive buffer memory 30, the memory overflows and incoming data is lost. Similar timing considerations apply to the transmit path, in which an underflow condition can result in data loss.

Figure 3:
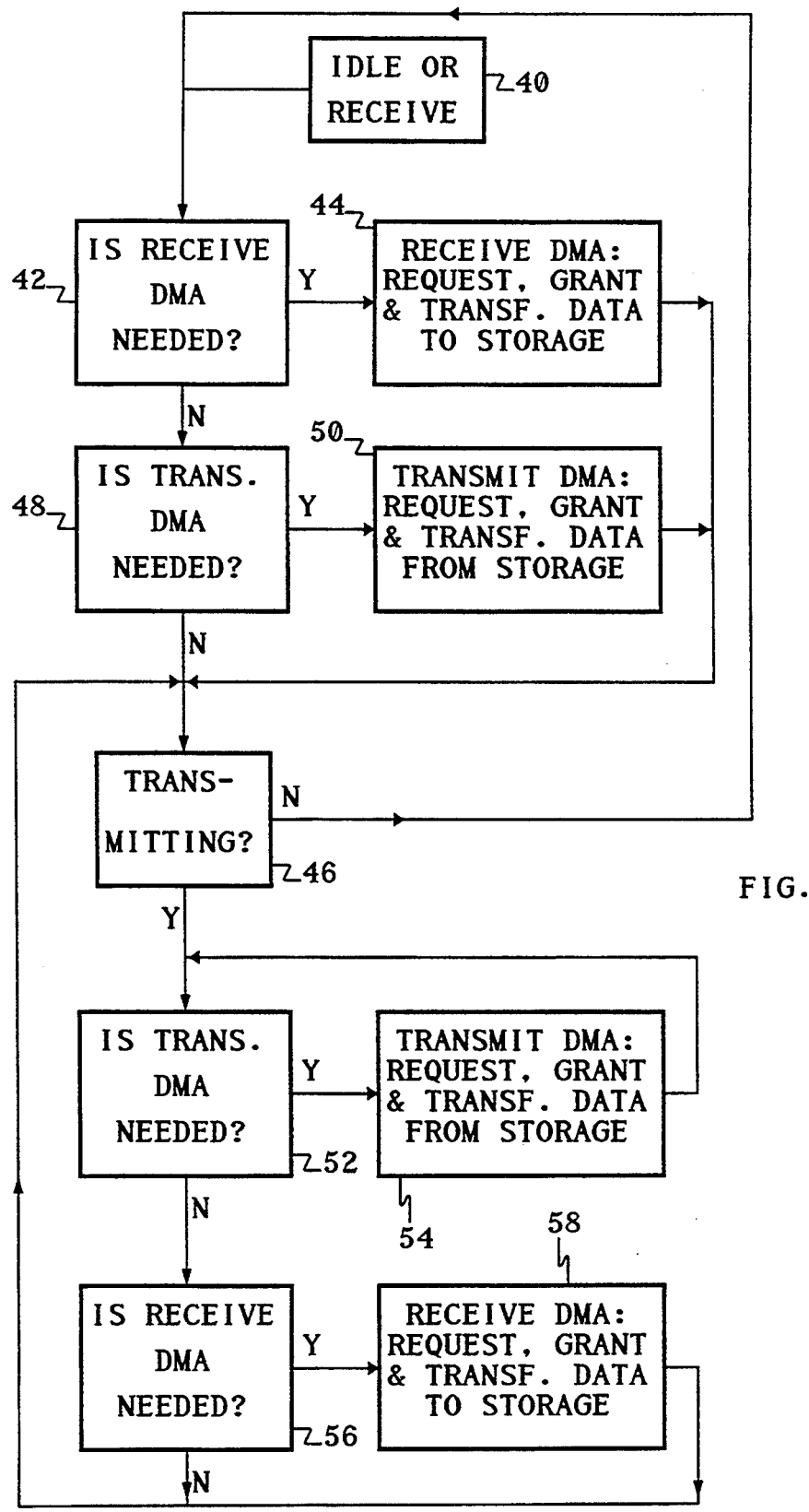
FIG. 3 is a flowchart showing the functions performed by the memory buffer management system of the invention.

In accordance with the invention, the buffer memories 30 and 32 are kept relatively small and are managed dynamically according to the operation currently being performed and the current latency of the system bus 12, as reflected in the degree to which the memories are filled. The priority scheme employed in the method and apparatus of the invention is probably best understood from the flowchart of FIG. 3.

In the buffer memory management scheme of the invention, different priorities are used depending on the status of the interface circuit 14 with respect to the network 10, i.e. whether the status is transmitting, receiving, or idle. If the status is receiving or idle, as indicated at 40, processing of the receive buffer memory 30 has priority. Therefore, the first question posed, as indicated in block 42, is whether a receive DMA (direct memory access) is needed. The answer to this question depends on whether the status is receiving or idle. If the status is idle, i.e. no data is being received from or transmitted onto the network, a receive DMA may still be needed if the receive buffer memory is not yet empty. A receive operation may have just been completed but the receive buffer memory still contains data, which must be written to the storage device 16. If the status is receiving, a receive DMA is needed only if the receive buffer memory 30 is filled above some preselected threshold, which means it is "nearly" full and should be further emptied of data.

In either case, if a receive DMA is needed it is requested, and after it is granted a data transfer is made from the receive buffer memory 30 to the storage device 16, as indicated in block 44. Then the status with respect to the network is checked in block 46, which asks whether the status is transmitting. If not, return is made to block 42 again, to determine whether a receive DMA is needed. If block 42 determines that no receive DMA is needed, the next question posed, in block 48, is whether a transmit DMA is needed. Since the status at this stage is not transmitting, a transmit DMA would be made only if there were data waiting in the storage device 16 to be transmitted and if the transmit buffer memory 32 was not already nearly full. Since block 48 can be reached only by first determining that no receive DMA is needed, it is appropriate to make any needed transmit DMA, to retrieve data from the storage device 16 and have it ready for transmission onto the network 10. As indicated in block 50, if a transmit DMA is needed, the request is made, and after a grant of the request a data transfer is made from the storage device 16 to the transmit buffer memory 32. Then the transmitting status is checked in block 46.

So long as nothing is being transmitted onto the network, processing follows the loop defined by blocks 42, 44, 48, 50 and 46. Receive DMAs have priority and transmit DMAs will be requested only if no receive DMA is needed.

When the status is transmitting, as determined in block 46, priority is switched to the transmit buffer memory. Since data is being transmitted onto the network, no data can be received from the network at the same time and the receive buffer memory 30 cannot be further filled. In processing during transmitting status, the first question posed is whether a transmit DMA is needed, as indicated in block 52. A transmit DMA is needed only if the transmit buffer memory 32 is "nearly" empty, as defined by a preselected low threshold level of the memory. As indicated in block 54, if a transmit DMA is needed it is requested, and after the request is granted a data transfer is made from the storage device 16 to the transmit buffer memory 32. Then the question of block 52 is repeated, to determine if a further transmit DMA is needed. Once the transmit buffer memory has been filled above the threshold level, no further transmit DMA is deemed immediately necessary, and the receive buffer memory 30 is checked to determine if any receive DMA is needed, as indicated in block 56. Even though the mode is transmitting, there may still be some recently received residual data in the receive buffer memory, which should be transferred to the storage device 16. Therefore, the question in block 56 is answered in the affirmative if the receive buffer memory 30 is not empty. If so, and as indicated in block 58, a receive DMA request is made, and after the request is granted a data transfer is made from the receive buffer memory 30 to the storage device 16. After processing the receive DMA request, if any, return is made to block 46, to check the transmitting/receiving/idle status again.

It will be understood that the function of the network interface 34 is to transmit data onto the network 10 whenever there is data in the transmit buffer memory 32, and to receive data from the network and transfer it to the receive buffer memory 30. These operations are similar to those that would be required in any buffered network interface, and they take place concurrently with the operations described with reference to FIG. 3.

In the presently preferred embodiment of the invention, data bursts of sixteen bytes each are used to transfer data to and from the storage device 16. The receive buffer memory 30 has a capacity of 64 bytes, or four bursts of data, and the transmit buffer memory 32 has a capacity of 48 bytes, or three bursts of data. The buffer memory threshold levels are set as needed for a particular system environment. For example, the "nearly full" threshold for the receive buffer memory could be set at one, two or three data bursts (16, 32 or 48 bytes), and the "nearly empty" threshold for the transmit buffer memory could be set at one or two data bursts (16 or 32 bytes). There is an approximate relationship between the latency of the system bus and the degree to which the buffer memories are filled. For example, when in receive mode a relatively full receive buffer memory is indicative of a relatively slow system bus access time. Likewise, when in the transmit mode a relatively empty transmit buffer memory is indicative of a relatively slow system bus access time.

It will be appreciated from the foregoing that the present invention represents a significant advance in buffer memory management, especially as applied to local area networks. In particular, the invention dynamically modifies buffer management priorities depending on the current mode of operation and the relative latency of the system bus to which the storage device is connected, as reflected by the buffer memory levels. It will also be appreciated that, although a particular embodiment of the invention has been described in detail by way of example, various modifications may be made without departing from the spirit and scope of the invention. Accordingly, the scope of the invention should not be limited except as by the appended claims.

We claim:

1. A method for managing bidirectional data flow between a first data bus having a fixed data flow rate and storage device connected to a second data bus having variable latency, the method comprising the steps of:

receiving inbound data from the first data bus at a fixed rate, once reception of data begins, and immediately storing the inbound data received from the first data bus in a receive buffer memory;

forwarding inbound data stored in the receive buffer memory to the storage device, by way of the second data bus;

retrieving outbound data from the storage device, by way of the second data bus, and storing the retrieved outbound data in a transmit buffer memory;

transmitting outbound data stored in the transit buffer memory onto the first data bus, at a rate that is fixed once access is granted to the first data bus; and controlling the steps of forwarding inbound data to the storage device and retrieving outbound data from the storage device, in such a manner as to require only small receive and transmit buffer memories and to minimize overflow of the receive buffer memory and underflow of the transmit buffer memory, wherein the step of controlling includes determining whether transmitting is in progress, and if transmitting is in progress, giving highest priority for storage device access to the step of retrieving outbound data from the storage device, whereby the possibility of underflowing the transmit buffer memory is minimized; if transmitting is not in progress, giving highest priority for storage device access to the step of forwarding inbound data to the storage device, whereby the possibility of overflowing the receive buffer memory is minimized.

2. A method as defined in claim 1, wherein the step of controlling further includes, if transmitting is in progress:

determining whether the transmit buffer memory is "nearly empty" as indicated by a preselected threshold level having been reached;

if the transmit buffer memory is nearly empty, initiating a request to retrieve more outbound data from the storage device; and if the transmit buffer memory is more full than nearly empty, and if the receive buffer memory is not empty, initiating a request to forward inbound data to the storage device.

3. A method as defined in claim 1, wherein the step of controlling further includes, if transmitting is not in progress:

determining whether a step of forwarding inbound data to the storage device is needed and, if so, initiating a request to forward inbound data to the storage device; and if a step of forwarding inbound data to the storage device is not needed, determining whether a step of retrieving outbound data from the storage device is needed and, if so, initiating such a request.

4. A method as defined in claim 3, wherein the step of determining whether a step of forwarding inbound data to the storage device is needed includes:

determining whether receiving is in progress;

if receiving is in progress, determining whether the receive buffer memory is "nearly full" as indicated by a preselected memory threshold level having been reached, whereby a nearly full receive buffer memory indicates a need to perform a step of forwarding inbound data to the storage device; and if receiving is not in progress, indicating an idle condition, determining whether the receive buffer memory is not empty, whereby a not empty condition indicates a need to perform a step of forwarding inbound data to the storage device.

5. A method as defined in claim 1, wherein the step of controlling includes:

determining whether transmitting is in progress and;

if transmitting is in progress, giving highest priority for storage device access to the step of retrieving outbound data from the storage device, whereby the possibility of underflowing the transmit buffer memory is minimized;

if transmitting is in progress,
determining whether the transmit buffer memory is "nearly empty" as indicated by a preselected threshold level having been reached,
if the transmit buffer memory is nearly empty, initiating a request to retrieve more outbound data from the storage device, and
if the transmit buffer memory is more full than nearly empty, and if the receive buffer memory is not empty, initiating a request to forward inbound data to the storage device;

if transmitting is not in progress, giving highest priority for storage device access to the step of forwarding inbound data to the storage device, whereby the possibility of overflowing the receive buffer memory is minimized; and if transmitting is not in progress,
determining whether a step of forwarding inbound data to the storage device is needed and, if so, initiating a request to forward inbound data to the storage device, and
if a step of forwarding inbound data to the storage device is not needed, determining whether a step of retrieving outbound data from the storage device is needed and, if so, initiating such a request.

6. A method as defined in claim 5, wherein the step of determining whether a step of forwarding inbound data to the storage device is needed includes:

determining whether receiving is in progress;

if receiving is in progress, determining whether the receive buffer memory is "nearly full" as indicated by a preselected memory threshold level having been reached, whereby a nearly full receive buffer memory indicates a need to perform a step of forwarding inbound data to the storage device; and if receiving is not in progress, indicating an idle condition, determining whether the receive buffer memory is not empty, whereby a not empty condition indicates a need to perform a step of forwarding inbound data to the storage device.

7. Apparatus for managing bidirectional data flow between a first data bus having a fixed data flow rate and storage device connected to a second data bus having variable latency, the apparatus comprising:

a receive buffer memory, for temporary storage of inbound data received from the first data bus and destined for the storage device;

a transmit buffer memory, for temporary storage of outbound data retrieved from the storage device and destined for the first data bus;

means for receiving inbound data from the first data bus at a fixed rate, once reception of data begins, and immediately storing the inbound data received from the first data bus in the receive buffer memory;

means for forwarding inbound data stored in the receive buffer memory to the storage device, by way of the second data bus;

means for retrieving outbound data from the storage device, by way of the second data bus, and storing the retrieved outbound data in the transmit buffer memory;

means for transmitting outbound data stored in the transmit buffer memory onto the first data bus, at a rate that is fixed once access is granted to the first data bus; and means for controlling the means for forwarding inbound data to the storage device and the means for retrieving outbound data from the storage device, in such a manner as to require only small receive and transmit buffer memories and to minimize overflow of the receive buffer memory and underflow of the transmit buffer memory, wherein the means for controlling includes means for determining whether transmitting is in progress, and transmit priority means, operative only if transmitting is in progress, giving highest priority for storage device access to the means for retrieving outbound data from the storage device, whereby the possibility of underflowing the transmit buffer memory is minimized;

wherein the transmit priority means includes means for determining whether the transmit buffer memory is "nearly empty" as indicated by a preselected threshold level having been reached, means operative only if the transmit buffer memory is nearly empty, for initiating a request to retrieve more outbound data from the storage device, and means operative only if the transmit buffer memory is more full than nearly empty, and if the receive buffer memory is not empty, for initiating a request to forward inbound data to the storage device.

8. Apparatus as defined in claim 7, wherein the means for controlling includes:

receive priority means, operative only if transmitting is not in progress, giving highest priority for storage device access to the means for forwarding inbound data to the storage device, whereby the possibility of overflowing the receive buffer memory is minimized;

wherein the receive priority means includes means for determining whether forwarding inbound data to the storage device is needed and, if so, initiating a request to forward inbound data to the storage device; and means operative only if forwarding inbound data to the storage device is not needed, for determining whether retrieving outbound data from the storage device is needed and, if so, initiating such a request.

9. Apparatus as defined in claim 8, wherein the means for determining whether forwarding inbound data to the storage device is needed includes:

means for determining whether receiving is in progress;

means operative only if receiving is in progress, for determining whether the receive buffer memory is "nearly full" as indicated by a preselected memory threshold level having been reached, whereby a nearly full receive buffer memory indicates a need for forwarding inbound data to the storage device; and means operative only if neither receiving nor transmitting is in progress, indicating an idle condition, for determining whether the receive buffer memory is not empty, whereby a not empty condition indicates a need for forwarding inbound data to the storage device.

* * * * *